United States Patent
Wegmann et al.

(10) Patent No.: US 9,867,092 B2
(45) Date of Patent: Jan. 9, 2018

(54) DETECTION AND INHIBITION OF MULTIPLE CONSECUTIVE INTER-RAT PING-PONG HANDOVERS

(71) Applicant: Nokia Solutions and Networks Oy, Espoo (FI)

(72) Inventors: Bernhard Wegmann, Holzkirchen (DE); Krzysztof Kordybach, Pulawy (PL)

(73) Assignee: Nokia Solutions and Networks Oy, Espoo (FI)

( * ) Notice: Subject to any disclaimer, the term of this patent is extended or adjusted under 35 U.S.C. 154(b) by 372 days.

(21) Appl. No.: 14/759,665

(22) PCT Filed: Jan. 18, 2013

(86) PCT No.: PCT/EP2013/050954
§ 371 (c)(1),
(2) Date: Jul. 8, 2015

(87) PCT Pub. No.: WO2014/111156
PCT Pub. Date: Jul. 24, 2014

(65) Prior Publication Data
US 2015/0358868 A1    Dec. 10, 2015

(51) Int. Cl.
*H04W 36/00* (2009.01)
*H04W 36/14* (2009.01)

(52) U.S. Cl.
CPC ........ *H04W 36/0083* (2013.01); *H04W 36/14* (2013.01)

(58) Field of Classification Search
None
See application file for complete search history.

(56) References Cited

U.S. PATENT DOCUMENTS 5,999,814 A    12/1999    Cuffaro et al. ............... 455/436
2014/0155065 A1*    6/2014    Centonza .......... H04W 36/0066
                                                                 455/436

FOREIGN PATENT DOCUMENTS

EP        2 465 294           2/2011
WO    WO2005/125232 A2    12/2005

OTHER PUBLICATIONS

3GPP TS 36.300 V11.3.0 (Sep. 2012) "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)"; 205 pages; 3rd Generation Partnership Project (3GPP); Mobile Competence Centre; 650, Route des Lucioles; F-06921 Sophia-Antipolis Cedex; France.

(Continued)

*Primary Examiner* — Charles Appiah
*Assistant Examiner* — Alexander Yi
(74) *Attorney, Agent, or Firm* — Harrington & Smith (57) ABSTRACT

There are provided measures for detection and inhibition of multiple consecutive inter-RAT ping-pong handovers (also called handover bounces). Such measures exemplarily include detecting multiple consecutive ping-pong handovers of a communication endpoint between two radio access technologies, wherein a ping-pong handover includes a handover from one of said two radio access technologies to the other of said two radio access technologies and a handover from the other of said two radio access technologies to the one of said two radio access technologies, and causing immediate inhibition of certain handovers of said communication endpoint.

20 Claims, 3 Drawing Sheets

```
S21: detecting multiple consecutive ping-pong handovers of a
communication endpoint between two radio access technologies,
wherein a ping-pong handover comprises a handover from one of
said two radio access technologies to the other of said two radio
access technologies and a handover from the other of said two
radio access technologies to the one of said two radio access
technologies S22: causing immediate inhibition of certain handovers of said
communication endpoint
```

(56) References Cited

OTHER PUBLICATIONS

3GPP TS 36.413 V11.2.0 (Dec. 2012) "3rd Generation Partnership Project; Technical Specification Group Radio Access Network; Evolved Universal Terrestrial Radio Access Network (E-UTRAN); S1 Application Protocol (S1AP) (Release 11)"; 272 pages; 3rd Generation Partnership Project (3GPP); Mobile Competence Centre; 650, Route des Lucioles; F-06921 Sophia-Antipolis Cedex; France.

3GPP TSG-RAN WG3 Meeting #75, Dresden, Germany, Feb. 6-10, 2011, R3-120279, "Ping-pong detection and correction in SON framework", Nokia Siemens Networks, 3 pgs.

3GPP TSG-RAN WG3 Meeting #78, New Orleans, USA, Nov. 12-16, 2012, R3-122776, "Update of the stage-2 MRO specification for Inter-RAT ping-pond detection", Nokia Siemens Networks, 3 pgs.

3GPP TS 32.762 V11.4.0 (Dec. 2012), "$3^{rd}$ Generation Partnership Project; Technical Specification Group Services and System Aspects; Telecommunication management; Evolved Universal Terrestrial Radio Access Network (E-UTRAN) Network Resource Model (NRM) Integration Reference Point (IRP); Information Service (IS), (Release 11)", 57 pgs.

\* cited by examiner

DETECTION AND INHIBITION OF MULTIPLE CONSECUTIVE INTER-RAT PING-PONG HANDOVERS

FIELD

The present invention relates to detection and inhibition of multiple consecutive inter-RAT ping-pong handovers. More specifically, the present invention exemplarily relates to measures (including methods, apparatuses and computer program products) for realizing detection and inhibition of multiple consecutive inter-RAT ping-pong handovers.

BACKGROUND

The present specification generally relates to mobile radio communications with focus on parallel operation of multiple radio access technologies (RAT), in particular Long Term Evolution (LTE) networks in combination with $3^{rd}$ Generation (3G) Universal Mobile Telecommunications System (UMTS)/High Speed Packet Access (HSPA) and/or with $2^{nd}$ Generation (2G) Global System for Mobile Communications (GSM)/General Packet Radio Service (GPRS) networks. In particular, the present specification is targeting on self optimizing networks (SON) with focus on the use case "mobility robustness optimization" (MRO) between different RATs. Inter-RAT MRO is discussed in $3^{rd}$ Generation Partnership Project (3GPP) as part of the LTE Release 11 SON framework.

Inter-RAT mobility describes the cell change of a terminal (e.g. user equipment (UE)) where the source and the target cell belong to different RATs. This cell change can be either caused by UE movement where the UE is leaving the coverage range of a certain RAT or by so-called traffic steering (TS) reasons which might even happen without real user movement.

In the first case the cell change is triggered by the radio condition of the serving and potential target cell. Signal of serving RAT becomes weak and falls below a certain threshold, while signal from measured target cell (of a target RAT) is above a certain threshold.

In the second case, for instance the load situation is decisive rather than the signal quality, which thus plays a secondary role in the second case.

3GPP Release 11 is considering the inter-RAT deployment scenario with limited LTE coverage and, therefore, is focusing on following two inter-RAT mobility failure cases:
Too late inter-RAT handover from LTE to 3G, and
Too early inter-RAT handover from 3G to LTE.

It is to be noted that there is a further inter-RAT mobility problem without a radio link failure (RLF), namely the inter-RAT ping-pong handovers where the UE is frequently performing handover forth and back between different RATs. The present specification focuses on the latter inter-RAT mobility problem.

In 3GPP, it is also distinguished between necessary and an unnecessary inter-RAT ping-pong handovers.

If a UE is frequently moving between two locations where the one or the other RAT has a coverage hole, inter-RAT ping-pong handovers are considered as being necessary and not as problem.

However, ping-pong handovers might also result from misaligned inter-RAT mobility parameter setting of the two RATs, most likely if radio driven and traffic steering driven handover are triggered in the different RATs. Those inter-RAT ping pongs are considered as being unnecessary.

Reasons for traffic steering driven handover are for instance load balancing among different RATs, energy saving with evacuating one RAT that is intended to be switched off, or RAT preferences for dedicated services.

The detection of inter-RAT ping-pong handovers is based on investigating the UE history information provided with the HANDOVER REQUEST message during handover preparation. The UE history information (information element (IE)) contains a list of the last visited cells with information about the cells themselves (e.g. E-UTRAN cell global identifier (ECGI)) and the time how long the UE stayed in these cells.

Two succeeding handovers are identified as inter-RAT ping pong if the UE history information shows that the last visited cell of the UE was of a different RAT with a rather short stay time ($T_{stay} < T_{thres\_shortstay}$) while the cell visited before the last visited one and the current cell belong to the same RAT, where $T_{stay\_otherRAT}$ is derived from the IE "time UE stayed in cell" as specified in last visited cell information for the cells, and $T_{thres\_shortstay}$ could be an internal MRO parameter to detect short stays and ping pongs.

The inter-RAT ping pong refers to the RAT layer and is independent of the cell itself. A corresponding MRO counter is incremented if the UE which has been handed over to a different RAT comes back to the previous RAT irrespective if it returns to the same cell which initiated the handover or to a different one.

That is, if for example a LTE cell A is initiating an inter-RAT handover to an UMTS cell X, the following two cases are considered as being inter-RAT ping pong:
Cell_A@LTE to Cell_X@UMTS (to more cells @UMTS) to Cell_A@LTE, and
Cell A@LTE to Cell_X@UMTS (to more cells @UMTS) to Cell_B@LTE.

Accordingly, in the context of inter-RAT the stay time $T_{stay\_otherRAT}$ is referring to RAT and not to a particular cell. Depending on the duration of $T_{stay\_otherRAT}$, the UE could be connected to several cells before coming back to the previous RAT. However, ping pong in general means a short stay (i.e. normally in one cell) of the new RAT and subsequent handover back to the initiating RAT.

Irrespective of to which cell the UE returns within LTE, the "guilty" cell which initiated the "short stay" in another RAT is Cell_A and, therefore, responsible for the inter-RAT ping pong. Therefore, in the second case above, an evolved NodeB (eNB) controlling Cell_B when detecting the ping-pong events between Cell_A, Cell_X and Cell_B, will inform the eNB controlling Cell_A using an X2 HANDOVER REPORT message.

Based on the assumptions, if there are any counters implemented to monitor the ping-pongs, those should be collected at the guilty node.

Corresponding to the above mentioned two cases, if for example a UMTS cell X is initiating an inter-RAT handover to an LTE cell A, the following two cases are considered as being inter-RAT ping-pong handover:
Cell_X@UMTS to Cell_A@LTE (to more cells @LTE) to Cell_X@UMTS, and
Cell_X@UMTS to Cell A@LTE (to more cells @LTE) to Cell_Y@UMTS.

In this case the following difference is to be noted. Namely, the difference on 3G side is that both cells Cell_X and Cell_Y are most likely controlled by the same radio network controller (RNC) and, therefore, no additional signaling is needed. The RNC is responsible for administration of the counters, but those are not specified within 3GPP so far but implementation specific.

Multiple ping pongs and multiple inter-RAT ping pongs are already occurring in existing 2G and 3G networks, but they are not specifically treated or counted in terms performance indicators. Only a considerable increase of the total number of handovers between some cells is remarkable. Accordingly, it is then up to network optimization experts to conclude from such increased number of handovers that "multiple consecutive ping pongs" might have been occurred.

Further, in GSM there are provided features like "Limitation of Intra-cell Handover Repetition" where in an interfered cell consecutive intra-cell handovers are to be avoided, since they cannot improve the quality, or "Prevention of Back-Handover" where handovers back to a cell which has been just left before are to be avoided by labeling the handover with "imperative" or "forced handovers", such that UEs are not allowed to be handed over back within a defined time frame.

However, the above mentioned features are proactive measures to avoid this sort of unwanted handovers without knowing that a ping pong will occur at all. Further, those measures do not provide any means for (automated) correction or optimization of mobility parameters.

Even though self-optimization of mobility parameters by MRO is going to be established with LTE, a particular treatment of "multiple ping-pong handovers" (i.e. multiple consecutive inter-RAT handovers forth and back) to overcome the issues mentioned above is not considered.

By means of prior art, each single "forth and back handover" would be counted, which may indicate that there is a massive ping pong problem. However, problems implied above and mentioned below (e.g. affecting control plane processing capacity) are not solved.

According to current specifications in 3GPP Rel. 11 SON framework a handling of inter-RAT ping-pong handovers consists of two steps, where in the first step a ping pong is detected and counted. In a second step, the ping pongs are further classified into necessary and unnecessary ones, wherein the unnecessary ones are then counted and reported as inter-RAT ping pongs. That is, these potentially "never ending" forth and back inter-RAT handovers are not considered to be specifically treated.

According to the Published European Patent Application EP 2 465 294 A1, it is suggested to deal with the inter-RAT ping pong problem by an exchange of messages between the nodes to manipulate the setting of the mobility parameters of the counterpart node. However, this document does not deal with the special case of multiple long lasting consecutive inter-RAT ping pongs (ping-pong handovers, handover bounces).

Hence, the problem of multiple consecutive (eventually never ending) inter-RAT ping pongs arises, where the UE is handed over back and forth with a very short connection time. A ping pong as such can be derived from UE history information and therefore the detection process is per se an eNB-internal procedure (or RNC-internal procedure, respectively), and thus implementation specific. The same holds for the detection of multiple ping pongs with many consecutively occurring back and forth handovers between two RATs.

According to the current definition in 3GPP, one single "forth and back handover" is detected as a ping pong and counted as such. In case of multiple consecutive "forth and back handovers" each of them fulfils the criterion for a ping pong and increments the ping pong counter. This leads to the problem that the ping pong counter will dramatically increase and might even risk an overflow of the counter.

A further problem is caused by fact that multiple consecutive ping-pong handovers might be a long lasting procedure and not a single event like a RLF. This long lasting procedure requires and takes worthwhile control plane processing capacity for preparation and execution of all of the ping pong handovers, and implicitly affects the complete cell within both RATs or even the complete nodes controlling these cells. Furthermore, the UE throughput is declining and might even confuse the higher layers (e.g. transmission control protocol (TCP) congestion control). A proper user plane connection can not be established, since the UE is continuously forced for inter-RAT measurements, handover preparations, new synchronization procedures, etc.

Accordingly, long lasting multiple consecutive ping pongs impair both network performance and user satisfaction.

A further problem arises for the (possibly) rare case that the UE returns from 3G alternating to different LTE cells (Cell_A@LTE to UMTS to Cell_B@LTE to UMTS to Cell_A@LTE and so on). Namely, in this case, X2 HANDOVER REPORT will be also sent forth and back between two LTE cells, such that each of the two cells increments the ping pong counter.

Hence, there is a need to provide for detection and inhibition of multiple consecutive inter-RAT ping-pong handovers.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method comprising detecting multiple consecutive ping-pong handovers of a communication endpoint between two radio access technologies, wherein a ping-pong handover comprises a handover from one of said two radio access technologies to the other of said two radio access technologies and a handover from the other of said two radio access technologies to the one of said two radio access technologies, and causing immediate inhibition of certain handovers of said communication endpoint.

According to an exemplary aspect of the present invention, there is provided an apparatus comprising detecting means configured to detect multiple consecutive ping-pong handovers of a communication endpoint between two radio access technologies, wherein a ping-pong handover comprises a handover from one of said two radio access technologies to the other of said two radio access technologies and a handover from the other of said two radio access technologies to the one of said two radio access technologies, and causing means configured to cause immediate inhibition of certain handovers of said communication endpoint.

According to an exemplary aspect of the present invention, there is provided an apparatus comprising a detecting module configured to detect multiple consecutive ping-pong handovers of a communication endpoint between two radio access technologies, wherein a ping-pong handover comprises a handover from one of said two radio access technologies to the other of said two radio access technologies and a handover from the other of said two radio access technologies to the one of said two radio access technologies, and a causing module configured to cause immediate inhibition of certain handovers of said communication endpoint.

According to an exemplary aspect of the present invention, there is provided an apparatus comprising means for detecting multiple consecutive ping-pong handovers of a communication endpoint between two radio access technologies, wherein a ping-pong handover comprises a handover from one of said two radio access technologies to the other of said two radio access technologies and a handover from the other of said two radio access technologies to the one of said two radio access technologies, and means for causing immediate inhibition of certain handovers of said communication endpoint.

According to an exemplary aspect of the present invention, there is provided a computer program product comprising computer-executable computer program code which, when the program is run on a computer (e.g. a computer of an apparatus according to any one of the aforementioned apparatus-related exemplary aspects of the present invention), is configured to cause the computer to carry out the method according to any one of the aforementioned method-related exemplary aspects of the present invention.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects enables an efficient handling of multiple consecutive inter-RAT ping-pong handovers to thereby solve at least part of the problems and drawbacks identified in relation to the prior art.

By way of exemplary embodiments of the present invention, there is provided detection and inhibition of multiple consecutive inter-RAT ping-pong handovers. More specifically, by way of exemplary embodiments of the present invention, there are provided measures and mechanisms for realizing detection and inhibition of multiple consecutive inter-RAT ping-pong handovers.

Thus, improvement is achieved by methods, apparatuses and computer program products enabling/realizing detection and inhibition of multiple consecutive inter-RAT ping-pong handovers.

BRIEF DESCRIPTION OF THE DRAWINGS

In the following, the present invention will be described in greater detail by way of non-limiting examples with reference to the accompanying drawings, in which.

DETAILED DESCRIPTION OF DRAWINGS AND EMBODIMENTS OF THE PRESENT INVENTION

The present invention is described herein with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. In particular, handovers of a communication endpoint between two RATs is used as a non-limiting example for the applicability of those described exemplary embodiments. As such, the description of exemplary embodiments given herein specifically refers to terminology which is directly related thereto. Such terminology is only used in the context of the presented non-limiting examples, and does naturally not limit the invention in any way. Rather, any other communication or communication related system deployment, etc. may also be utilized as long as compliant with the features described herein.

Hereinafter, various embodiments and implementations of the present invention and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to exemplary embodiments of the present invention, in general terms, there are provided measures and mechanisms for (enabling/realizing) detection and inhibition of multiple consecutive inter-RAT ping-pong handovers.

Figure 1:
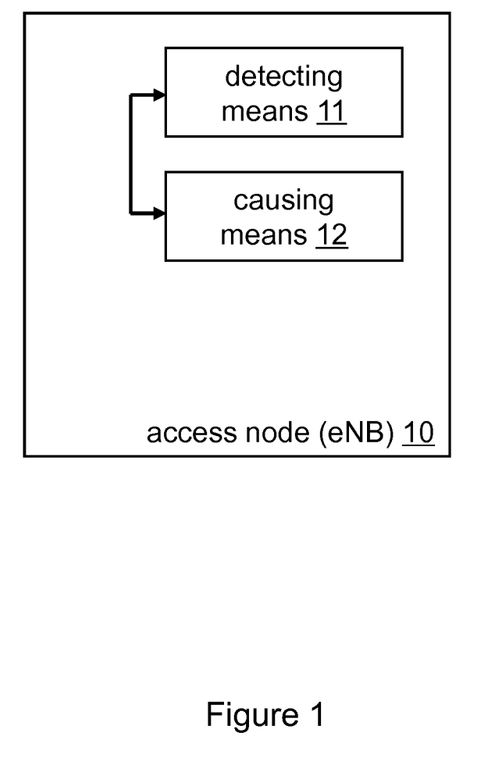
FIG. 1 is a block diagram illustrating an apparatus according to exemplary embodiments of the present invention.
Figure 2:
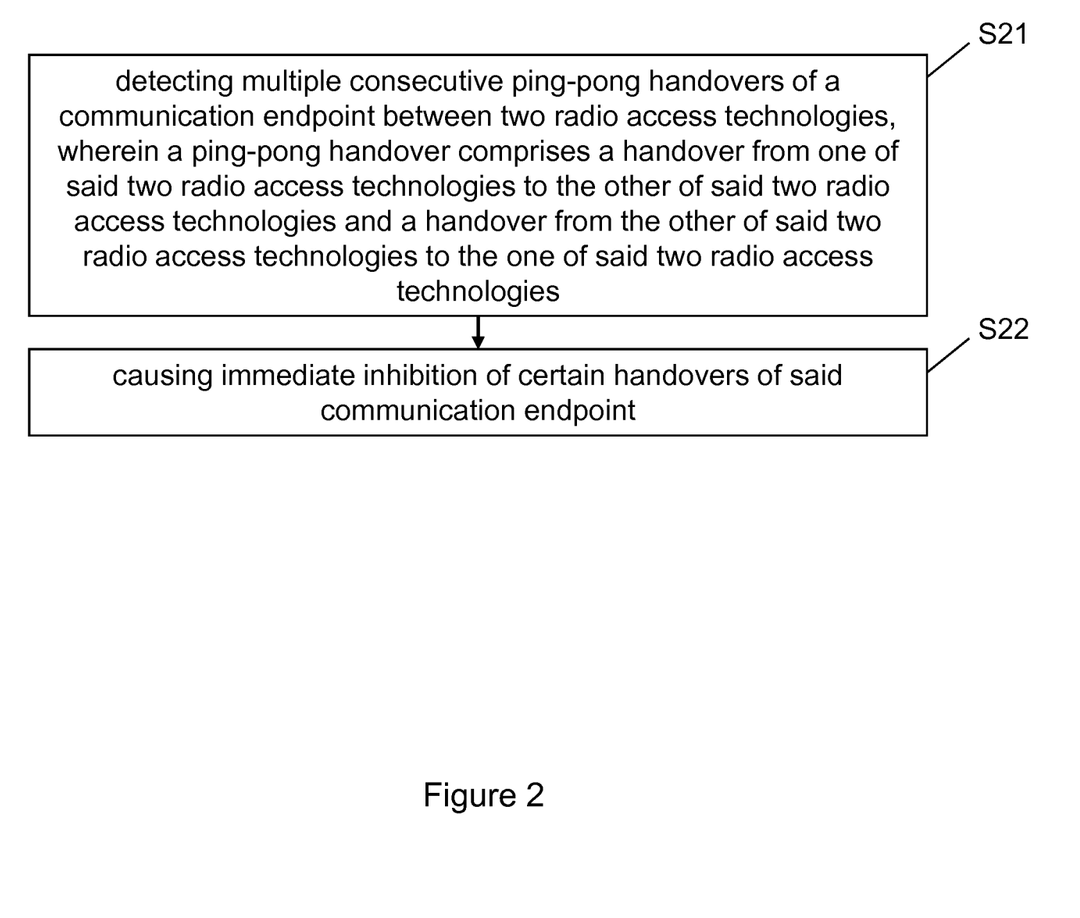
FIG. 2 is a schematic diagram of a procedure according to exemplary embodiments of the present invention.

FIG. 1 is a block diagram illustrating an apparatus according to exemplary embodiments of the present invention. The apparatus may be an access node such as an eNB. FIG. 2 is a schematic diagram of a procedure according to exemplary embodiments of the present invention. The apparatus according to FIG. 1 may perform the method of FIG. 2 but is not limited to this method. The method of FIG. 2 may be performed by the apparatus of FIG. 1 but is not limited to being performed by this apparatus.

As multiple consecutive ping-pong handovers are lasting events without a defined end, according to exemplary embodiments of the present invention those multiple consecutive ping-pong handovers are to be inhibited. That is, according to exemplary embodiments of the present invention, MRO is able to stop the multiple ping pongs immediately when detected and identified as such.

As shown in FIG. 1, according to exemplary embodiments of the present invention, the apparatus is a network node 10 comprising a detecting means 11 and a causing means 12. The detecting means 11 detects multiple consecutive ping-pong handovers of a communication endpoint between two radio access technologies, wherein a ping-pong handover comprises a handover from one of said two radio access technologies to the other of said two radio access technologies and a handover from the other of said two radio access technologies to the one of said two radio access technologies. The causing means causes immediate inhibition of certain handovers of said communication endpoint.

Hereby, an important requirement for the stopping process is to stop the ping pong activity and not to break the connection.

It is to be noted that the realization of the stopping procedure depends on MRO implementation aspects, namely whether MRO is implemented only on LTE side (what is currently assumed in 3GPP) or if both RATs have MRO capabilities. Exemplary embodiments of the present invention focus on implementation of MRO (root cause analysis) on LTE only following the 3GPP solution. Such root cause analysis investigates the handover direction (to or from the own radio access technology) as well as the type of the handover trigger causing the respective handover. Accordingly, each combination of handover direction and handover trigger type forms a certain root cause.

According to exemplary embodiments of the present invention, the apparatus further comprises determining means and controlling means. The determining means determines a specific root cause for said multiple consecutive ping-pong handovers based on a handover trigger type of said handovers of said multiple consecutive ping-pong handovers. The controlling means controls said inhibition based on said specific root case.

According to further embodiments of the present invention, the apparatus further comprises dividing means. The dividing means divides the handovers of said multiple consecutive ping-pong handovers into handovers from an own radio access technology to a not own radio access technology and handovers from said not own radio access technology to said own radio access technology. With respect to the determining means, it is said that the specific root cause is determined based on said handover trigger type of said handovers from said own radio access technology and said handover trigger type of said handovers to said own radio access technology.

In this regard it is noted that the own radio access technology is the radio access technology which is served by the apparatus. That is, if for example the apparatus is an eNB serving in a LTE network deployment having implemented the root cause analysing part of MRO, the own radio access technology is LTE.

Correspondingly, the not own radio access technology is the radio access technology other than the own radio access technology involved in the multiple ping-pong handover process. That is, in the above given example the not own radio access technology is a RAT other than LTE. This might, as also mentioned above, be for example a 3G technology like e.g. UMTS/HSPA or a 2G technology like e.g. GSM/GPRS.

Besides the immediate inhibition of the multiple ping-pong handovers, a separate counter for these "oscillating" ping pongs is to be introduced in order to allow a dedicated treatment in terms of correction, for instance within a different time interval. Preferably, such counter is set (and incremented, respectively) for instance immediately after detection and inhibition.

The realization of the stopping process is different for several cases, where exemplarily the following four cases are discussed in detail. Each of those different cases is characterized by a specific root cause as mentioned above.

Exemplary case 1 is the case if a ping pong stream occurs where the handovers from LTE to the other-RAT are traffic steering (TS) triggered.

According to exemplary embodiments of the present invention, if only said handovers from said own radio access technology are of traffic steering handover trigger type, in relation to said controlling, the apparatus further comprises an identifying means, a requesting means and an incrementing means. The identifying means identifies, as said specific root cause of said detected multiple consecutive ping-pong handovers, occurring traffic steering handover trigger from said own radio access technology. The requesting means requests prohibition of said handovers from said own radio access technology to said not own radio access technology. The incrementing means increments a counter indicative of the specific root cause. The counter allows an adjustment of settings.

In other words, since a TS-based handover is based on operator policy and is not necessarily needed to keep the connection alive the TS-triggered handover should be inhibited.

In this case, the inhibition can be carried out on LTE side. MRO detects and informs TS unit about the multiple ping pong problem and requires that TS-trigger handovers towards the corresponding cell/RAT known from analysis are prohibited.

In addition, a separate counter "multiple inter-RAT ping pong caused by TS" is incremented. The counter is administered in the cell which has initiated the TS-triggered HO.

It is noted that standardization impact results for the rare case that the UE is returning from 3G to different LTE cells in alternating manner. For this rare case, the X2 HANDOVER REPORT should be sent only after several identical events are recorded. The message is to be enhanced with an information element informing how many events are reported. Otherwise the respective counter may not be reliable.

That is, according to further exemplary embodiments of the present invention, if said detected multiple consecutive ping-pong handovers oscillate between a first cell and a second cell of said own radio access technology, the apparatus further comprises counting means configured to count said multiple consecutive ping-pong handovers related to one cell of said first and said second cell of said own radio access technology, and sending means configured to send a message comprising at least the count of said multiple consecutive ping-pong handovers related to said one cell of said first and said second cell of said own radio access technology.

According to exemplary embodiments of the present invention, the apparatus further comprises transmission means. The transmitting means transmits said counter.

That is, the correction is under responsibility of the TS entity and depends on the MRO counter. The correction procedure can be realized in a centralized manner (i.e. counter has to be reported to central unit e.g. OAM) or in a decentralized way where the TS entity of counting eNB is doing the re-adjustment directly.

In case of centralized approach the new counter preferably has to be reported via interface N (Itf-N) and, therefore, it has to be specified in 3GPP TS 32.762. In case of distributed approach, this procedure can be carried out eNB internally and would be purely implementation specific.

It is to be noted that an immediate reaction means that correction is carried out when counter is incremented once.

Exemplary case 2 is the case if a ping pong stream occurs where the handovers from other-RAT to LTE have been TS triggered while on LTE side necessary radio based handovers are triggered.

In such case the radio-based handover from LTE cannot be prohibited because RLF would be risked.

According to exemplary embodiments of the present invention, two options to stop the ping pong flow are proposed.

As one option, it is tried to change the target RAT and/or target cell. That is, a redirection of the UE is strived.

As an alternative option, incoming TS-triggered handovers from the corresponding other-RAT are rejected with HANDOVER PREPARATION FAILURE including a new cause "multiple inter-RAT ping pong". Such new cause is then to be added in TS 36.413 (section 9.2.1.3).

According to exemplary embodiments of the present invention, if only said handovers from said not own radio access technology are of traffic steering handover trigger type, in relation to said controlling, the apparatus further comprises identifying means, forcing means, at least one of changing means and rejecting means, and in any case incrementing means. The identifying means identifies, as said specific root cause of said detected multiple consecutive ping-pong handovers, occurring traffic steering handover trigger from said not own radio access technology. The forcing means forces prohibition of said handovers from said not own radio access technology by use of the changing means or the rejecting means. The changing means changes a target radio access technology of said handovers from said own radio access technology. Alternatively, the changing means changes a target cell of said handovers from said own radio access technology, wherein said target cell uses said not own radio access technology. Alternatively, the rejecting means rejects incoming handovers to said own radio access technology from said not own radio access technology, if said incoming handovers are of traffic steering handover trigger type. The incrementing means increments a counter indicative of the specific root cause. The counter allows an adjustment of settings.

That is, in order provide also correction measures both stopping options should be followed by an incrementing of a new corresponding counter. If a problem like "multiple inter-RAT ping pong caused by TS from other-RAT" is detected in the LTE cell, the administration of the corresponding counter should be in controlling node of the cell triggering a TS-based handover (which is the guilty one), and therefore also an inter-RAT message exchange based on radio access network (RAN) information management (RIM) application (corresponding to current "too early inter-RAT handover" problem), i.e. a new variable for the IE "type of detected handover problem" of the transferred information is to be added.

The correction can be steered again by a centralized unit, i.e. the controlling node administering the new counter is reporting this counter to OAM via Itf-N and, therefore, it might be specified in 3GPP TS 32.762.

That is, according to still further embodiments of the present invention, the apparatus comprises transmitting means. The transmitting means transmits said counter.

Alternatively, the correction is done in a distributed manner by the controlling itself.

Exemplary case 3 is the case if a ping pong stream occurs where the handovers in both directions are radio based handovers.

Even though for this case the thresholds on one RAT might be much too optimistic or too conservative, respectively, i.e. totally misconfigured, mobility management entity is not aware thereof and a radio based handover cannot be ignored. From stopping perspective, this is a kind of deadlock situation, since it might cause a call drop.

According to exemplary embodiments of the present invention, if said handovers from said own radio access technology and said handovers from said not own radio access technology are of radio based handover trigger type, in relation to said controlling, the apparatus further comprises identifying means, forcing means, changing means and incrementing means. The identifying means identifies, as said specific root cause of said detected multiple consecutive ping-pong handovers, occurring radio based handover trigger from said own radio access technology and said not own radio access technology. The forcing means forces prohibition of said handovers from said own radio access technology by using the changing means. The changing means changes a target radio access technology of said handovers from said own radio access technology. Alternatively, the changing means changes a target cell of said handovers from said own radio access technology, wherein said target cell uses said not own radio access technology. Further, the incrementing means increments a counter indicative of the specific root cause. The counter allows an adjustment of settings.

That is, the multiple ping pong problem is detected and can be counted in a new counter, but cannot be inhibited without risk of connection loss if redirection is not possible. After detection, a redirection of the UE to a different target RAT and/or target cell is tried. The corresponding counter is considered in the inter-RAT MRO process and correction of the mis-configured parameters is done by MRO based on this counter.

Exemplary case 4 is the case if a ping pong stream occurs where the handovers in both directions are TS-triggered handovers.

Such scenario reveals clear misalignment of traffic steering parameters between the two RATs. To stop the ping pong flow the same approach as used in case 1 is applied. A new different counter "inter-RAT ping pong caused by TS from both RATs" is incremented.

In other words, according to exemplary embodiments of the present invention, if said handovers from said own radio access technology and said handovers from said not own radio access technology are of traffic steering handover trigger type, in relation to said controlling, the apparatus further comprises identifying means, requesting means and incrementing means. The identifying means identifies, as said specific root cause of said detected multiple consecutive ping-pong handovers, occurring traffic steering handover trigger from said own radio access technology and said not own radio technology. The requesting means requests prohibition of said handovers from said own radio access technology to said not own radio access technology. The incrementing means increments a counter indicative of the specific root cause. The counter allows an adjustment of settings.

In case of a centralized approach the new counter has to be reported via Itf-N and, therefore, it has to be specified in 3GPP TS 32.762.

That is, according to exemplary embodiments of the present invention, the apparatus further comprises transmitting means. The transmitting means transmits said counter.

Alternatively, in case of distributed approach, this procedure can be carried out in eNB internally and would be implementation specific.

Similarly as in case 1, the X2 HANDOVER REPORT may additionally be enhanced with an information element informing how many events are reported so, since otherwise the counter may not be reliable.

That is, according to further exemplary embodiments of the present invention, if said detected multiple consecutive ping-pong handovers oscillate between a first cell and a second cell of said own radio access technology, the apparatus further comprises counting means configured to count said multiple consecutive ping-pong handovers related to one cell of said first and said second cell of said own radio access technology, and sending means configured to send a message comprising at least the count of said multiple consecutive ping-pong handovers related to said one cell of said first and said second cell of said own radio access technology.

Thus, according to exemplary embodiments of the present invention, each specific root cause a dedicated counter may be associated, which is only incremented, if the respective root cause is detected.

According to still further exemplary embodiments of the present invention, the apparatus further comprises receiving means, obtaining means and deciding means. The receiving means receives handover history information for said communication endpoint. The obtaining means obtains a count of handovers of said communication endpoint between said two radio access technologies from said handover history information. The deciding means decides that multiple consecutive ping-pong handovers exist, if said count is equal to or larger than a predetermined threshold.

In other words, as the long lasting forth and back handovers are more or less only occurring for UEs which are completely or nearly stationary, the coverage analysis (for deciding whether the respective ping pong of handover is a necessary one or a unnecessary one) according to prior art, where coverage verification is performed, is not relevant.

However, the MRO unit on LTE investigates UE history information and detects $N_{thr}$ consecutive inter-RAT handovers indicating an oscillating inter-RAT ping pong and starts the stopping procedure. The procedure begins with the analysis of the handover cause values of the $N_{thr}$ last visited cells recorded in the UE history information, where $N_{thr}$ is the number of subsequent forth and back handovers with subsequent short stays that identifies a multiple consecutive ping pong (i.e. a threshold). $N_{thr}$ is a configurable parameter.

FIG. 2 is a schematic diagram of a procedure according to exemplary embodiments of the present invention.

As shown in FIG. 2, a procedure according to exemplary embodiments of the present invention in its most basic form comprises an operation of detecting multiple consecutive ping-pong handovers of a communication endpoint between two radio access technologies, wherein a ping-pong handover comprises a handover from one of said two radio access technologies to the other of said two radio access technologies and a handover from the other of said two radio access technologies to the one of said two radio access technologies, and an operation of causing immediate inhibition of certain handovers of said communication endpoint.

The above-described procedures and functions may be implemented by respective functional elements, processors, or the like, as described below.

In the foregoing exemplary description of the network entity, only the units that are relevant for understanding the principles of the invention have been described using functional blocks. The network entity may comprise further units that are necessary for its respective operation. However, a description of these units is omitted in this specification. The arrangement of the functional blocks of the devices is not construed to limit the invention, and the functions may be performed by one block or further split into sub-blocks.

When in the foregoing description it is stated that the apparatus, i.e. network node (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

Figure 3:
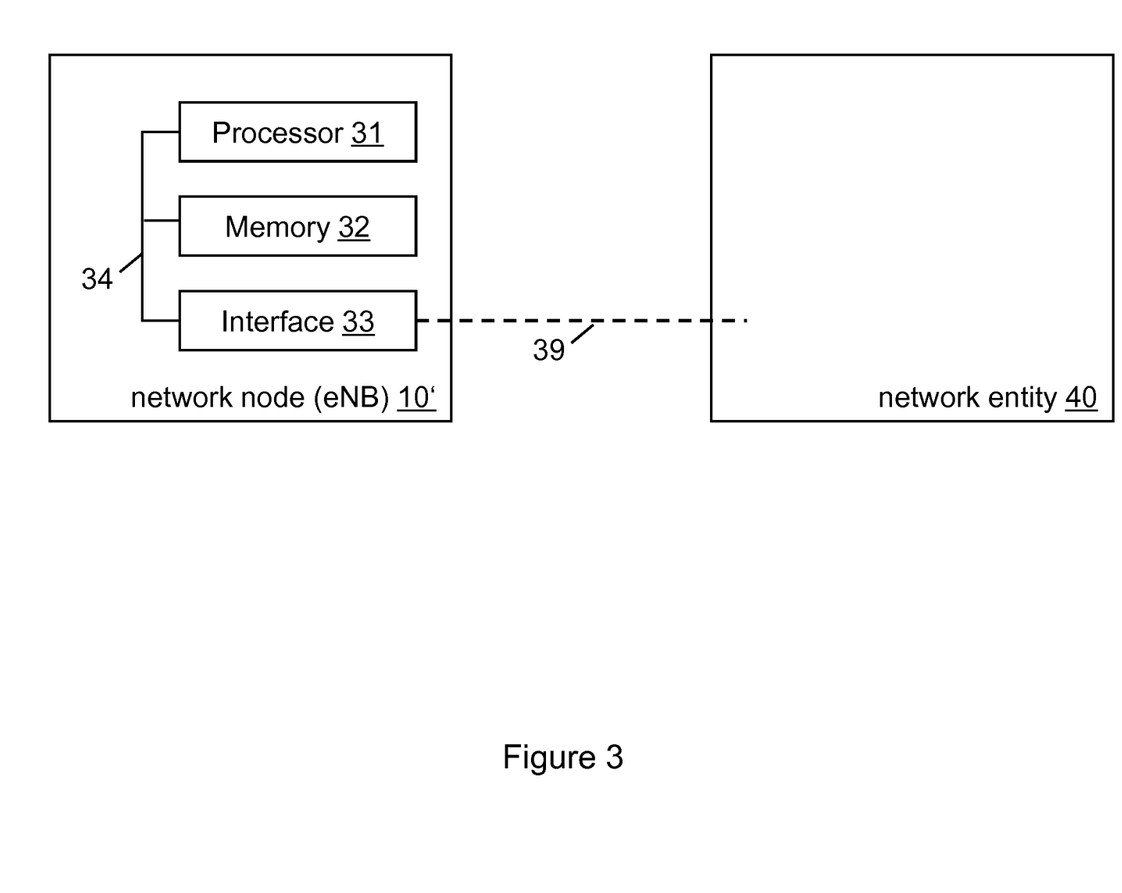
FIG. 3 is a block diagram alternatively illustrating an apparatus according to exemplary embodiments of the present invention.

In FIG. 3, an alternative illustration of an apparatus according to exemplary embodiments of the present invention is depicted. As indicated in FIG. 3, according to exemplary embodiments of the present invention, the apparatus (network node) 10' (corresponding to the network node 10) may be an eNB and comprises a processor 31, a memory 32 and an interface 33, which are connected by a bus 34 or the like. The apparatus 10' may be connected with other apparatuses like a network entity 40 via link 69, respectively.

The processor 31 and/or the interface 33 may also include a modem or the like to facilitate communication over a (hardwire or wireless) link, respectively. The interface 33 may include a suitable transceiver coupled to one or more antennas or communication means for (hardwire or wireless) communications with the linked or connected device(s), respectively. The interface 33 is generally configured to communicate with at least one other apparatus, i.e. the interface thereof.

The memory 32 may store respective programs assumed to include program instructions or computer program code that, when executed by the respective processor, enables the respective electronic device or apparatus to operate in accordance with the exemplary embodiments of the present invention.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to exemplary embodiments of the present invention, an apparatus representing the network node 10 comprises at least one processor 31, at least one memory 32 including computer program code, and at least one interface 33 configured for communication with at least another apparatus. The processor (i.e. the at least one processor 31, with the at least one memory 32 and the computer program code) is configured to perform detecting multiple consecutive ping-pong handovers of a communication endpoint between two radio access technologies, wherein a ping-pong handover comprises a handover from one of said two radio access technologies to the other of said two radio access technologies and a handover from the other of said two radio access technologies to the one of said two radio access technologies (thus the apparatus comprising corresponding means for detecting), and to perform causing immediate inhibition of certain handovers of said communication endpoint (thus the apparatus comprising corresponding means for causing).

For further details regarding the operability/functionality of the individual apparatuses, reference is made to the above description in connection with any one of FIG. 1 or 2, respectively.

For the purpose of the present invention as described herein above, it should be noted that method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;

an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for detection and inhibition of multiple consecutive inter-RAT ping-pong handovers. Such measures exemplarily comprise detecting multiple consecutive ping-pong handovers of a communication endpoint between two radio access technologies, wherein a ping-pong handover comprises a handover from one of said two radio access technologies to the other of said two radio access technologies and a handover from the other of said two radio access technologies to the one of said two radio access technologies, and causing immediate inhibition of certain handovers of said communication endpoint.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

LIST OF ACRONYMS AND ABBREVIATIONS

2G $2^{nd}$ Generation
3G $3^{rd}$ Generation
3GPP $3^{rd}$ Generation Partnership Project
E-UTRAN evolved UMTS terrestrial radio access network
ECGI E-UTRAN cell global identifier
eNB evolved NodeB
GPRS General Packet Radio Service
GSM Global System for Mobile Communications
HSPA High Speed Packet Access
IE information element
Itf-N interface N
LTE Long Term Evolution
MRO mobility robustness optimization
OAM operation and maintenance
RAT radio access technologies
RAN radio access network
RIM RAN information management
RLF radio link failure
RNC radio network controller
SON self optimizing networks
TCP transmission control protocol
TS traffic steering UE user equipment
UMTS Universal Mobile Telecommunications System

The invention claimed is:

1. A method comprising
detecting multiple consecutive ping-pong handovers of a communication endpoint between two radio access technologies,
wherein a ping-pong handover comprises a handover from one of said two radio access technologies to the other of said two radio access technologies and a handover from the other of said two radio access technologies to the one of said two radio access technologies, and
causing immediate inhibition of certain handovers of said communication endpoint; and
further comprising, wherein in relation to said causing, the method further comprises determining a specific root cause for said multiple consecutive ping-pong handovers based on handover trigger types of said handovers that occur for each different handover direction and that are grouped separately for different handover directions of said multiple consecutive ping-pong handovers, and controlling said inhibition based on said specific root cause, wherein each combination of the handover direction and the handover trigger type forms the specific root cause.

2. The method according to 1, wherein
in relation to said determining, the method further comprises dividing said handovers of said multiple consecutive ping-pong handovers into handovers from an own radio access technology to a not own radio access technology and handovers from said not own radio access technology to said own radio access technology, wherein
said specific root cause is determined based on said handover trigger type of said handovers from said own radio access technology and said handover trigger type of said handovers to said own radio access technology.

3. The method according to claim 2, wherein
when only said handovers from said own radio access technology are of traffic steering handover trigger type, in relation to said controlling, the method further comprises
identifying, as said specific root cause of said detected multiple consecutive ping-pong handovers, occurring traffic steering handover trigger from said own radio access technology,
requesting prohibition of said handovers from said own radio access technology to said not own radio access technology, and
incrementing a counter indicative of said specific root cause, wherein said counter allows an adjustment of settings.

4. The method according to claim 3, wherein
if said detected multiple consecutive ping-pong handovers oscillate between a first cell and a second cell of said own radio access technology, the method further comprises
counting said multiple consecutive ping-pang handovers related to one cell of said first and said second cell of said own radio access technology, and
sending a message comprising at least the count of said multiple consecutive ping-pong handovers related to said one cell of said first and said second cell of said own radio access technology.

5. The method according to claim 2, wherein when only said handovers from said not own radio access technology are of traffic steering handover trigger type, in relation to said controlling, the method further comprises
identifying, as said specific root cause of said detected multiple consecutive ping-pong handovers, occurring traffic steering handover trigger from said not own radio access technology, and
forcing prohibition of said handovers from said not own radio access technology by
changing a target radio access technology of said handovers from said own radio access technology, or
changing a target cell of said handovers from said own radio access technology, wherein said target cell uses said not own radio access technology, or
rejecting incoming handovers to said own radio access technology from said not own radio access technology, if said incoming handovers are of traffic steering handover trigger type, and
incrementing a counter indicative of said specific root cause, wherein said counter allows an adjustment of settings.

6. The method according to claim 2, wherein
when said handovers from said own radio access technology and said handovers from said not own radio access technology are of radio based handover trigger type, in relation to said controlling, the method further comprises
identifying, as said specific root cause of said detected multiple consecutive ping-pong handovers, occurring radio based handover trigger from said own radio access technology and said not own radio access technology, and
forcing prohibition of said handovers from said own radio access technology by
changing a target radio access technology of said handovers from said own radio access technology, or
changing a target cell of said handovers from said own radio access technology, wherein said target cell uses said not own radio access technology, and
incrementing a counter indicative of said specific root cause, wherein said counter allows an adjustment of settings.

7. The method according to claim 2, wherein
when said handovers from said own radio access technology and said handovers from said not own radio access technology are of traffic steering handover trigger type, in relation to said controlling, the method further comprises
identifying, as said specific root cause of said detected multiple consecutive ping-pong handovers, occurring traffic steering handover trigger from said own radio access technology and said not own radio technology,
requesting prohibition of said handovers from said own radio access technology to said not own radio access technology, and
incrementing a counter indicative of said specific root cause, wherein said counter allows an adjustment of settings.

8. The method according to claim 7, wherein when said detected multiple consecutive ping-pong handovers oscillate between a first cell and a second cell of said own radio access technology, the method further comprises
counting said multiple consecutive ping-pong handovers related to one cell of said first and said second cell of said own radio access technology, and
sending a message comprising at least the count of said multiple consecutive ping-pong handovers related to said one cell of said first and said second cell of said own radio access technology.

9. The method according to claim 1, wherein
in relation to said detecting, the method further comprises
receiving handover history information for said communication endpoint,
obtaining a count of handovers of said communication endpoint between said two radio access technologies from said handover history information, and
deciding that multiple consecutive ping-pong handovers exist, if said count is equal to or larger than a predetermined threshold.

10. An apparatus comprising:
at least one memory including computer program code; and
at least one processor,
the at least one memory and the computer program code configured, with the at least one processor, to cause the apparatus to perform at least the following:
detect multiple consecutive ping-pong handovers of a communication endpoint between two radio access technologies, wherein a ping-pong handover comprises a handover from one of said two radio access technologies to the other of said two radio access technologies and a handover from the other of said two radio access technologies to the one of said two radio access technologies, and
cause immediate inhibition of certain handovers of said communication endpoint, and
further comprising
determine a specific root cause for said multiple consecutive ping-pong handovers based on a handover trigger types of said handovers that occur for each different handover direction and that are grouped separately for different handover directions of said multiple consecutive ping-pong handovers, and
control said inhibition based on said specific root cause, wherein each combination of the handover direction and the handover trigger type forms the specific root cause.

11. The apparatus according to claim 10, wherein the at least one memory and the computer program code are further configured, with the at least one processor, to cause the apparatus to perform at least the following:
divide said handovers of said multiple consecutive ping-pong handovers into handovers from an own radio access technology to a not own radio access technology and handovers from said not own radio access technology to said own radio access technology, wherein said specific root cause is determined based on said handover trigger type of said handovers from said own radio access technology and said handover trigger type of said handovers to said own radio access technology.

12. The apparatus according to claim 11, wherein
when only said handovers from said own radio access technology are of traffic steering handover trigger type, the at least one memory and the computer program code are further configured, with the at least one processor, to cause the apparatus to perform at least the following: identify, as said specific root cause of said detected multiple consecutive ping-pong handovers, occurring traffic steering handover trigger from said own radio access technology,
request prohibition of said handovers from said own radio access technology to said not own radio access technology, and
increment a counter indicative of said specific root cause, wherein said counter allows an adjustment of settings.

13. The apparatus according to claim 12, wherein
when said detected multiple consecutive ping-pong handovers oscillate between a first cell and a second cell of said own radio access technology, the at least one memory and the computer program code are further configured, with the at least one processor, to cause the apparatus to perform at least the following:
count said multiple consecutive ping-pong hand-overs related to one cell of said first and said second cell of said own radio access technology, and
send a message comprising at least the count of said multiple consecutive ping-pong handovers related to said one cell of said first and said second cell of said own radio access technology.

14. The apparatus according to claim 11, wherein
when only said handovers from said not own radio access technology are of traffic steering handover trigger type, the at least one memory and the computer program code are further configured, with the at least one processor, to cause the apparatus to perform at least the following:
identify, as said specific root cause of said detected multiple consecutive ping-pong handovers, occurring traffic steering handover trigger from said not own radio access technology, and
force prohibition of said handovers from said not own radio access technology by
change a target radio access technology of said handovers from said own radio access technology, or
change a target cell of said handovers from said own radio access technology, wherein said target cell uses said not own radio access technology, or
reject incoming handovers to said own radio access technology from said not own radio access technology, if said incoming handovers are of traffic steering handover trigger type, and
increment a counter indicative of said specific root cause, wherein said counter allows an adjustment of settings.

15. The apparatus according to claim 11, wherein
when said handovers from said own radio access technology and said handovers from said not own radio access technology are of radio based handover trigger type, the at least one memory and the computer program code are further configured, with the at least one processor, to cause the apparatus to perform at least the following:
identify, as said specific root cause of said detected multiple consecutive ping-pong handovers, occurring radio based handover trigger from said own radio access technology and said not own radio access technology, and
force prohibition of said handovers from said own radio access technology by
change a target radio access technology of said handovers from said own radio access technology, or
change a target cell of said handovers from said own radio access technology, wherein said target cell uses said not own radio access technology, and
increment a counter indicative of said specific root cause, wherein said counter allows an adjustment of settings.

16. The apparatus according to claim 11, wherein
when said handovers from said own radio access technology and said handovers from said not own radio access technology are of traffic steering handover trigger type, the at least one memory and the computer program code are further configured, with the at least one processor, to cause the apparatus to perform at least the following:

identify, as said specific root cause of said detected multiple consecutive ping-pong handovers, occurring traffic steering handover trigger from said own radio access technology and said not own radio technology, request prohibition of said handovers from said own radio access technology to said not own radio access technology, and increment a counter indicative of said specific root cause, wherein said counter allows an adjustment of settings.

17. The apparatus according to claim 16, wherein when said detected multiple consecutive ping-pong handovers oscillate between a first cell and a second cell of said own radio access technology, the at least one memory and the computer program code are further configured with the at least one processor, to cause the apparatus to perform at least the following:

count said multiple consecutive ping-pong handovers related to one cell of said first and said second cell of said own radio access technology, and send a message comprising at least the count of said multiple consecutive ping-pong handovers related to said one cell of said first and said second cell of said own radio access technology.

18. The apparatus according to claim 10, wherein the at least one memory and the computer program code are further configured, with the at least one processor, to cause the apparatus to perform at least the following:

receive handover history information for said communication endpoint, obtain a count of hangovers of said communication endpoint between said two radio access technologies from said handover history information, and decide that multiple consecutive ping-pong handovers exist, if said count is equal to or larger than a predetermined threshold.

19. The apparatus according to claim 10, wherein the apparatus is operable as or at a base station or access node of a cellular system, and/or the apparatus is operable in at least one of a LTE and a LTE-A cellular system.

20. A computer program product comprising computer-executable computer program code which, when the program is run on a computer, is configured to cause the computer to carry out the following, and wherein the computer program product comprises a non-transitory computer-readable medium on which the computer-executable computer program code is stored, and/or wherein the program is directly loadable into an internal memory of the processor:

detecting multiple consecutive ping-pong handovers of a communication endpoint between two radio access technologies, wherein a ping-pong handover comprises a handover from one of said two radio access technologies to the other of said two radio access technologies and a handover from the other of said two radio access technologies to the one of said two radio access technologies, and causing immediate inhibition of certain handovers of said communication endpoint; and further comprising, wherein in relation to said causing, the method further comprises determining a specific root cause for said multiple consecutive ping-pong handovers based on handover trigger types of said handovers that occur for each different handover direction and that are grouped separately for different handover directions of said multiple consecutive ping-pong handovers, and controlling said inhibition based on said specific root cause, wherein each combination of the handover direction and the handover trigger type forms the specific root cause.

* * * * *

UNITED STATES PATENT AND TRADEMARK OFFICE
CERTIFICATE OF CORRECTION

PATENT NO. : 9,867,092 B2  
APPLICATION NO. : 14/759665  
DATED : January 9, 2018  
INVENTOR(S) : Wegmann et al.

Page 1 of 1

It is certified that error appears in the above-identified patent and that said Letters Patent is hereby corrected as shown below:

In the Claims

Claim 4, Column 15, Line 59 "ping-pang" should be deleted and --ping-pong-- should be inserted.

Claim 18, Column 19, Line 34 "hangovers" should be deleted and --handovers-- should be inserted.

Signed and Sealed this  
Tenth Day of April, 2018

Andrei Iancu  
*Director of the United States Patent and Trademark Office*